US012796855B2

(12) United States Patent
Raimondi et al.

(10) Patent No.: US 12,796,855 B2
(45) Date of Patent: Nov. 17, 2026

(54) COFFEE MACHINE PROVIDED WITH AN ARRANGEMENT FOR THE PRE-INFUSION OF THE COFFEE PANEL

(71) Applicant: RANCILIO GROUP S.P.A., Parabiago (IT)

(72) Inventors: Stefano Raimondi, Parabiago (IT); Valerio Locati, Parabiago (IT)

(73) Assignee: RANCILIO GROUP S.P.A., Parabiago (IT)

( * ) Notice: Subject to any disclaimer, the term of this patent is extended or adjusted under 35 U.S.C. 154(b) by 894 days.

(21) Appl. No.: 17/910,976

(22) PCT Filed: Mar. 1, 2022

(86) PCT No.: PCT/IB2022/051795
§ 371 (c)(1),
(2) Date: Sep. 12, 2022

(87) PCT Pub. No.: WO2022/195388
PCT Pub. Date: Sep. 22, 2022

(65) Prior Publication Data

US 2024/0206672 A1 Jun. 27, 2024

(30) Foreign Application Priority Data

Mar. 17, 2021 (IT) ........................ 102021000006356

(51) Int. Cl.
*A47J 31/46* (2006.01)

(52) U.S. Cl.
CPC ........... *A47J 31/469* (2018.08); *A47J 31/461* (2018.08)

(58) Field of Classification Search
CPC ........ A47J 31/469; A47J 31/461; A47J 31/46; A47J 31/5251; A47J 31/24; A47J 31/34; A47J 31/00
See application file for complete search history.

(56) References Cited

U.S. PATENT DOCUMENTS 4,583,449 A 4/1986 Dangel et al.
6,199,472 B1 * 3/2001 Greiwe .................. A47J 31/34 99/302 R (Continued)

FOREIGN PATENT DOCUMENTS

| | | | |
|---|---|---|---|
| EP | 0540440 | A1 | 5/1993 |
| EP | 3430951 | A1 | 1/2019 |
| IT | MI20091847 | A1 | 4/2011 |

OTHER PUBLICATIONS

International Search Report and Written Opinion of the International Searching Authority issued for International PCT Application No. PCT/IB2022/051795 on Jun. 22, 2022.

*Primary Examiner* — Rodolphe Andre Chabreyrie
(74) *Attorney, Agent, or Firm* — Howson & Howson LLP

(57) ABSTRACT

A coffee machine is provided that comprises one or more brewing groups and that has a system for delivering water under reduced pressure at a step of pre-infusion of the coffee panel before the step of actual infusion and brewing of the coffee-based beverage. Each brewing group (3*a*, 3*b*) of the coffee machine (1), a secondary feeding duct (9*a*, 9*b*) in which water under higher pressure flows, and a secondary bypass duct (11*a*, 11*b*), in which water under reduced pressure flows, can selectively be communicated with the respective brewing group. The pre-infusion system of the coffee machine (1) allows effecting pre-infusion in each brewing group in a separate and independent manner.

12 Claims, 1 Drawing Sheet

(56) References Cited

U.S. PATENT DOCUMENTS

| | | | | |
|---|---|---|---|---|
| 8,802,174 | B2 | 8/2014 | Porzio et al. | |
| 10,687,661 | B2 | 6/2020 | Raimondi et al. | |
| 11,439,270 | B2 | 9/2022 | Cingolani | |
| 2012/0291634 | A1 * | 11/2012 | Startz | A47J 31/002 99/323.3 |
| 2013/0259995 | A1 * | 10/2013 | Porzio | A47J 31/002 426/433 |
| 2014/0197554 | A1 * | 7/2014 | Bonsch | B01F 23/235 261/37 |
| 2016/0278569 | A1 * | 9/2016 | Coccia | A47J 31/36 |
| 2020/0229634 | A1 * | 7/2020 | Cappellini | A47J 31/46 |

* cited by examiner

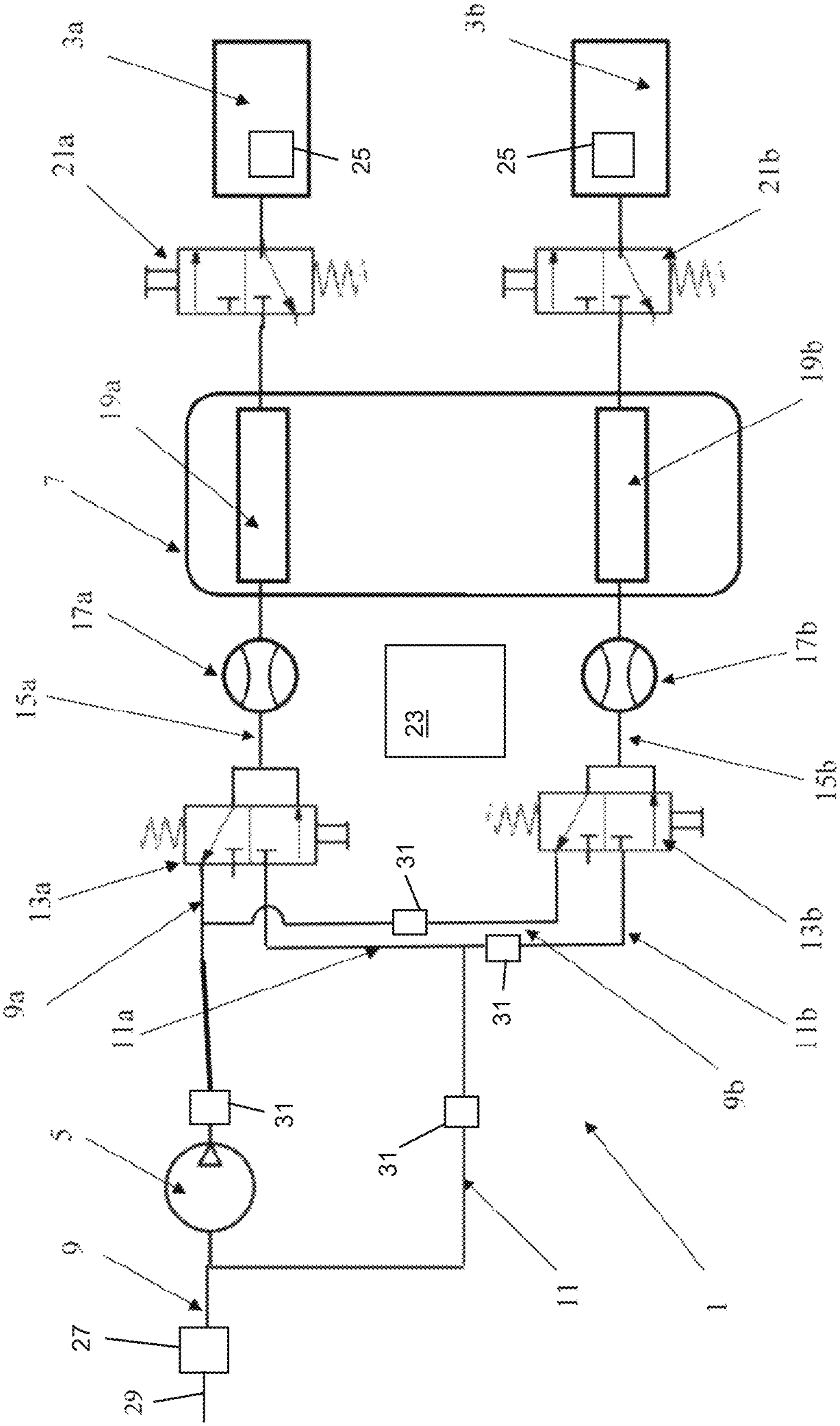
3a
3b
25
25
21a
21b
19a
19b
7
17a
17b
15a
15b
23
13a
13b
31
31
31
31
9a
9b
11a
11b
5
9
11
1
27
29

COFFEE MACHINE PROVIDED WITH AN ARRANGEMENT FOR THE PRE-INFUSION OF THE COFFEE PANEL

TECHNICAL FIELD

The present invention relates to a coffee machine, more particularly to an espresso coffee machine, comprising one or more brewing groups.

In particular, the present invention relates to a coffee machine provided with a system for delivering water under reduced pressure at a step of a pre-infusion of the coffee panel, aimed at "wetting" said coffee panel before the actual infusion step in which water under high pressure is delivered.

Advantageously, the coffee machine according to the invention further allows effecting a post-infusion step with delivery of water again under reduced pressure after said actual infusion step.

BACKGROUND ART

Coffee machines, especially espresso coffee machines, are known in which a flow of water under high pressure and at high temperature flows through a panel of coffee powder in order to generate a coffee-based beverage.

In general, said espresso coffee machines comprise one or more brewing groups, a filter holder unit containing a filter being associated with each of said brewing groups: a predetermined dose of coffee powder obtained by milling coffee beans is introduced into the filter holder and then pressed by means of a tamper, thereby obtaining a panel of coffee powder.

Said espresso coffee machines comprise or are connected to a source of water under low pressure and at low temperature and they are provided with one or more boilers for raising the temperature of water as well as with one or more pumps for raising the pressure of water, so that a flow of water under high pressure and at high temperature can be sent to the brewing group (or to one of the brewing groups) of the coffee machine and passed through the coffee panel.

Said coffee machines further comprise a control unit allowing adjusting the operational parameters of the boiler (s), of the pump(s) and of the hydraulic circuit connecting the water source to the brewing group(s), whereby the water pressure, temperature and flow rate values can be set each time depending on the desired organoleptic properties of the beverage prepared. In particularly sophisticated solutions, it can also be envisaged that the values of one or more out of pressure, temperature and flow rate of the water reaching the brewing group are not constant over the entire brewing time, but vary according to a predetermined profile stored in the control unit.

In any case, brewing of the coffee-based beverage takes place by means of a water flow at high temperature (for example about 93°) and under high pressure (for example about 9 bar).

It has been found, however, that direct introduction of a high-pressure water flow through the coffee panel brings about some drawbacks that can negatively affect the quality of the beverage obtained.

In particular, it has been observed that a high-pressure water flow coming into contact with a panel of pressed and dry coffee powder tends to establish and follow preferred paths, whereby there is no homogeneous extraction of aromatic substances from the whole dose of coffee powder. In other words, along said preferred paths extraction takes place only during a first part of the brewing step, whereas during a second part of said brewing step the water flow is unable to extract further aromatic substances; instead, in those regions of the coffee panel that are far from said paths, the extraction of aromatic substances at the end of the brewing step is only partial and non-optimized.

In order to overcome said drawback, a known solution envisages to provide a pre-infusion step upstream of the actual infusion step, in which pre-infusion step the coffee panel is passed through by a water flow at high temperature but under low pressure.

Such water flow under low pressure allows uniformly "wetting" the coffee panel, without starting the process of extraction of aromatic substances from the coffee powder.

When the thus "wetted" coffee panel is passed through by a water flow under high pressure, homogeneous diffusion of water inside the panel, and therefore homogeneous and optimized extraction of aromatic substances from the coffee powder, is observed.

The pre-infusion step with low-pressure water has further the effect of causing release of gases that may be present in the coffee powder panel (especially carbon dioxide that may be formed inside the coffee beans during roasting).

The release of gases from the coffee panel has the beneficial effect of increasing the contact surface between water and coffee powder grains, thus increasing the efficiency of extraction of aromatic substances from said coffee powder.

In order to implement the process described above—which includes a pre-infusion step and a step of actual infusion—different technical solutions were implemented in the past.

However, the known solutions have in common the fact that they are very complex.

By way of example, patent application EP 2 642 903, in the name of the Applicant, describes a coffee machine comprising a brewing group to which water at different pressure levels can be delivered. To this aim, said coffee machine comprises a hydraulic circuit in which a first duct and a second duct are provided arranged in parallel to each other, a pump arranged to raise the water pressure being provided on one (and only one) of said ducts.

In the solution described in the above-cited document, both in the first duct and in the second duct there is provided a dedicated valve, and said valves are not simple shut-off valves, but they are valves designed so as to dynamically control the pressure in each duct.

Such complexity, in this as well as in other known solutions, generally results in increased production costs, increased space requirement for the hydraulic circuit and—due to the presence of a high number of components and/or the presence of sophisticated components—increased risk of breakdowns.

The aforesaid drawbacks are even more relevant in the case of professional espresso coffee machines (commonly used in cafés, restaurants, hotels etc.), which usually comprise a plurality of brewing groups.

In this case, each brewing group must have a dedicated pre-infusion system, with consequent increase in the complexity of the coffee machine as a whole and in the drawbacks related thereto.

Alternatively, in the case in which a pre-infusion system common to all the brewing groups were provided, it would be impossible to start a brewing cycle of a brewing group whenever another brewing group were already being used.

An object of the present invention is to overcome the prior art problems set forth above, by providing a coffee machine provided with a simple and reliable system for the pre-infusion of the coffee panel, with a reduced number of components.

Another object of the invention is to provide a coffee machine that can be equipped with separate sub-systems for the pre-infusion of the coffee panel for each brewing group of the coffee machine without this involving any excessive increase in the overall complexity of the structure of the coffee machine itself.

These and other objects are achieved by a coffee machine as claimed in the appended claims.

SUMMARY OF INVENTION

In a manner known per se, the coffee machine according to the invention comprises one or more brewing groups, a source of water under low pressure and at low temperature, a hydraulic circuit connecting said water source to said one or more brewing groups, a pump arranged in said hydraulic circuit, between said water source and said one or more brewing groups, and adapted to raise the pressure of the water circulating in said hydraulic circuit, and a boiler arranged in said hydraulic circuit, between said water source and said one or more brewing groups, and adapted to raise the temperature of the water circulating in said hydraulic circuit, so that a water flow at high temperature and under high pressure can be passed through said one or more brewing groups.

Each of the one or more brewing groups of the coffee machine is adapted to receive a filter holder containing a panel of pressed coffee powder, through which said water flow at high temperature and under high pressure passes in order to obtain brewing of the coffee-based beverage.

The coffee machine according to the invention is provided with a system for the pre-infusion of said coffee panel.

Correspondingly, the hydraulic circuit comprises a feeding duct connected to the water source, and a bypass duct branching off from said feeding duct upstream of the pump.

Downstream of the pump, said feeding duct branches off into one or more secondary feeding ducts, one for each brewing group of the coffee machine. Similarly, said bypass duct branches off into one or more secondary bypass ducts, one for each brewing group of the coffee machine.

For each brewing group, the pre-infusion system of the coffee machine according to the invention comprises a valve assembly which receives at its inlet a corresponding secondary feeding duct and a corresponding secondary bypass duct and selectively communicates said secondary feeding duct or said secondary bypass duct with an outlet duct carrying the water flow to the respective brewing group.

Depending on whether the valve assembly communicates the secondary feeding duct or the secondary bypass duct with the respective outlet duct, either a water flow under a pressure determined by the pump (high pressure) or a water flow under a pressure equal to the pressure present in the hydraulic circuit upstream of the pump (low pressure) will be sent to the corresponding brewing group.

In the simplest embodiment of the invention, the valve assembly consists of a single three-way valve, for example a three-way electro-valve.

It is therefore evident that the coffee machine according to the invention comprises a system for the pre-infusion of the coffee panel which is very simple and comprises a limited number of components: in particular, it does not involve the need of providing separate pumps for each brewing group and may provide for a single valve for each brewing group.

At the same time, the coffee machine according to the invention comprises a system for the pre-infusion of the coffee panel which allows several brewing groups to operate simultaneously with and independently of one another: a secondary feeding duct, the corresponding secondary bypass duct and the valve assembly into which said ducts converge form a pre-infusion sub-system for the respective brewing group, the operation of said pre-infusion sub-system being entirely independent of the operation of the pre-infusion sub-systems of the remaining brewing groups.

Advantageously, the pre-infusion system of the coffee machine according to the invention, besides effectively allowing uniform "wetting" of the coffee panel before the actual infusion step with high-pressure water, can also be used for effecting a post-infusion step after the aforesaid actual infusion step. In said post-infusion step, the valve assembly communicates again the secondary bypass duct with the respective outlet duct, whereby a low-pressure water flow is sent to the corresponding brewing group.

BRIEF DESCRIPTION OF DRAWINGS

Features and advantages of the present invention will become more apparent from the description of a preferred embodiment, given by way of non-limiting example with reference to the annexed FIG. 1.

FIG. 1 schematically shows the hydraulic circuit of a coffee machine according to the invention.

DESCRIPTION OF EMBODIMENTS

Referring to FIG. 1, this illustrates the hydraulic circuit of a coffee machine according to the invention. Said coffee machine may be, for example, an espresso coffee machine of the so-called "semi-automatic" type.

In a manner known per se, the coffee machine 1 according to the invention comprises a water source 27, one or more brewing groups, in particular two brewing groups 3*a*, 3*b* in the illustrated embodiment, and a hydraulic circuit connecting said water source 27 to said brewing groups.

The water source 27 may consist, for example, of a reservoir 27 integrated in or connected to the coffee machine, or of a connecting element 29 for connection to an outer water mains.

A pump 5, intended to raise the pressure of water circulating in said hydraulic circuit, and a boiler 7, intended to raise the temperature of water circulating in said hydraulic circuit, are arranged in said hydraulic circuit, whereby a water flow under high pressure and at high temperature can be passed through each brewing group 3*a*, 3*b*.

Each brewing group 3*a*, 3*b* receives a filter holder 25 containing a predetermined dose of pressed coffee powder (coffee panel), whereby infusion and brewing of a coffee-based beverage can be obtained by means of the passage of said water flow under high pressure and at high temperature through the coffee panel.

For the reasons set forth above, it is preferable that the actual infusion step be preceded by a pre-infusion step during which the coffee panel present in the filter holder inserted in the brewing group is passed through by a water flow under low pressure.

For this purpose, the hydraulic circuit of the coffee machine 1 according to the invention comprises a feeding duct 9 connected to the water source, and a bypass duct 11 branching off from said feeding duct upstream of the pump 5.

Downstream of the pump 5, the feeding duct 9 branches off into two secondary feed ducts or infusion ducts 9*a*, 9*b*, one for each brewing group 3*a*, 3*b*.

The bypass duct 11, in turn, branches off into two secondary bypass ducts or pre-infusion ducts 11*a*, 11*b*.

A first secondary feeding duct 9*a* and a first secondary bypass duct 11*a* converge towards a first valve assembly; in particular, in the illustrated embodiment, the first secondary feeding duct 9*a* and the first secondary bypass duct 11*a* are connected to the respective inlets of a first three-way electro-valve 13*a*.

Likewise, the second secondary feeding duct 9*b* and the second secondary bypass duct 11*b* converge towards a second valve assembly, and more specifically they are connected to the respective inlets of a second three-way electro-valve 13*b*.

The outlet of each three-way electro-valve 13*a*, 13*b* is connected to a respective outlet duct 15*a*, 15*b*.

As illustrated in FIG. 1, a flowmeter 17*a*, 17*b* may be provided on each outlet duct 15*a*, 15*b*.

Each outlet duct 15*a*, 15*b* passes through the boiler 7 and the temperature of the water flowing in said outlet duct rises. To this aim, each outlet duct may be provided, at its portion arranged inside the boiler 7, with a heat exchanger 19*a*, 19*b*.

Downstream of the boiler 7, each outlet duct 15*a*, 15*b* arrives at the corresponding brewing group 3*a*, 3*b*. In a manner known per se, each brewing group 3*a*, 3*b* is provided with a brewing group valve 21*a*, 21*b* of its own, arranged on the respective outlet duct 15*a*, 15*b*, for selectively allowing or preventing entry of a water flow into the brewing group itself.

It will be evident to the person skilled in the art that each three-way electro-valve 13*a*, 13*b* can alternatively communicate the corresponding secondary feeding duct 9*a*, 9*b* or the corresponding secondary bypass duct 11*a*, 11*b* with the respective outlet duct 15*a*, 15*b* and, thus, with the respective brewing group 3*a*, 3*b*.

Therefore, if the three-valve 13*a*, 13*b* communicates the secondary bypass duct 11*a*, 11*b* with the outlet duct 15*a*, 15*b* and, therefore, with the respective brewing group 3*a*, 3*b*, a water flow at high temperature but under low pressure (the pressure present in the hydraulic circuit upstream of the pump 5) will be delivered to said brewing group. In this way, pre-infusion of the coffee panel can be made.

Instead, if the three-way electro-valve 13*a*, 13*b* communicates the secondary feeding duct 9*a*, 9*b* with the outlet duct 15*a*, 15*b* and, therefore, with the respective brewing group 3*a*, 3*b*, a water flow at high temperature and under high pressure (the pressure determined by the operating conditions of the pump 5) will be delivered to said brewing group. In this way, actual infusion of the coffee panel can be made, with extraction of aromatic substances and brewing of the coffee-based beverage.

It should be noted that a pressure reducer 31 may be arranged in the bypass duct 11 or in one or more of the secondary bypass ducts 11*a*, 11*b* (possibly in all the secondary bypass ducts 11*a*, 11*b*), so that a desired pressure value can be set for the pre-infusion step of all the brewing groups or of each of them.

Likewise, a pressure reducer may be arranged in the feeding duct 9 or in one or more of the secondary feeding ducts 9*a*, 9*b* (possibly in all the secondary feeding ducts 9*a*, 9*b*), so that a desired pressure value (different from the one determined by the pump 5) can be set for the infusion step of all the brewing groups or of each of them.

It is clear from the above that in its simplicity, the pre-infusion system of the coffee machine according to the invention allows the coffee panel to be fed with a water flow either with a first, lower, pressure value or with a second, higher, pressure value.

Introducing said pre-infusion system into the coffee machine does not involve introducing further pumps or boilers, whereby the only additional components related to said pre-infusion system are a three-way electro-valve for each brewing group. As a result, even in the case of a coffee machine comprising a high number of brewing groups, the increase in the complexity of the structure of the hydraulic circuit (and therefore in its production costs) is in any case limited.

Advantageously, the first secondary feeding duct 9*a*, the first secondary bypass duct 11*a* and the first electro-valve 13*a* form a pre-infusion sub-system for the first brewing group 3*a*, said pre-infusion sub-system being separate from and independent of the pre-infusion sub-system intended for the second brewing group 3*b* and consisting of the second secondary feeding duct 9*b*, the second secondary bypass duct 11*b* and the second electro-valve 13*b*. Therefore, each brewing group will be able to operate independently of the other brewing groups.

In other words, by acting onto the three-way electro-valves 13*a*, 13*b* it will be possible to deliver a high-pressure water flow to one of the brewing groups at the same time when a low-pressure water flow is delivered to the other brewing group.

The operation of the coffee machine according to the invention can be summarized as follows:

- while the pump 5 and the boiler 7 are switched on, a brewing cycle of a brewing group 3*a* of the coffee machine 1 is triggered;
- a filter holder containing a panel of pressed coffee powder is inserted into said brewing group 3*a;*
- the corresponding electro-valve 13*a* is switched to a position in which it communicates the secondary bypass duct 11*a* with the outlet duct 15*a*, and the corresponding brewing group valve 21*a* is switched to a position in which it allows the communication of the outlet duct 15*a* with the brewing group 3*a*; in this way the brewing group is fed with water at high temperature and under low pressure (pre-infusion) and the coffee panel is "wetted";
- after a predetermined time interval, the electro-valve 13*a* is switched to position in which it communicates the secondary feeding duct 9*a* with the outlet duct 15*a*; in this way, the brewing group is fed with water at high temperature and under high pressure (infusion) and the coffee-based beverage is brewed;
- after a further predetermined time interval, the brewing group electro-valve 21*a* is switched to a position in which it prevents the communication of the outlet duct 15*a* with the brewing group 3*a* and brewing of the coffee-based beverage ends.

It will be evident to the person skilled in the art that the coffee machine 1 will be equipped with or connected to a control unit 23 having a memory containing all the parameters necessary for preparing the different coffee-based beverages selectable in said coffee machine, and said memory of said control unit will 23 contain, among others, the values for the time interval of the pre-infusion step as well as those for the time interval of the infusion step for each beverage.

In some applications and for some types of coffee-based beverages it may be of advantage to end preparation by feeding water under low pressure to the coffee panel.

Advantageously, such a post-infusion step under low pressure can be obtained in the coffee machine according to the invention.

Indeed, it will be sufficient that the electro-valve 13*a* be switched again to a position in which it communicates the secondary bypass duct 11*a* with the outlet duct 15*a*, while keeping the brewing group valve 21*a* in the position in which it allows the communication of the outlet duct 15*a* with the brewing group 3*a*, so as to feed again the brewing group with water at high temperature and under low pressure.

This post-infusion step, too, will have a predetermined duration stored (for each beverage) in the memory of the control unit of the coffee machine.

Clearly, the embodiment described above in connection with the annexed FIGURE has been provided merely by way of example, without any limiting meaning, and several modifications and variants within the reach of the person skilled in art can be made without thereby departing from the scope of protection as defined in the appended claims.

In particular, although the use of three-way electro-valves is particularly advantageous in terms of simplification of the hydraulic circuit and reduction of the overall number of components used, it is clear that the valve assemblies of the pre-infusion system might have any other structure suitable for selectively communicating their own outlet duct with the respective secondary feeding duct or the respective secondary bypass duct, and might comprise combinations of several valves arranged in series and/or in parallel.

The invention claimed is:

1. A coffee machine, comprising:

a water source, one or more brewing groups and a hydraulic circuit connecting the water source to the one or more brewing groups, wherein a pump is arranged in the hydraulic circuit, between the water source and the one or more brewing groups, for raising the pressure of water circulating in the hydraulic circuit, and a boiler is arranged in the hydraulic circuit, between the water source and the one or more brewing groups, for raising the temperature of water circulating in the hydraulic circuit, wherein each of the one or more brewing groups is arranged to receive a filter holder containing a coffee panel, wherein the hydraulic circuit comprises a feeding duct, connected to the water source, and a bypass duct, branching off from the feeding duct upstream of the pump, wherein the feeding duct, downstream of the pump, branches off into one or more secondary feeding ducts, one for each brewing group of the coffee machine, and the bypass duct branches off into one or more secondary bypass ducts, one for each brewing group of the coffee machine, wherein the hydraulic circuit comprises one or more valve assemblies, one for each brewing group of the coffee machine, wherein each of the one or more secondary feeding ducts and each of the one or more secondary bypass ducts are connected independently and directly on a respective one of the one or more valve assemblies, which selectively communicates either a respective one of the one or more secondary feeding ducts or a respective one of the one or more secondary bypass ducts with a respective one of one or more outlet ducts, which in turn is connected to a respective one of the one or more brewing groups, wherein the coffee machine is equipped with or connected to a control unit having a memory, and wherein the memory of the control unit contains a value for a time interval during which the respective one of the one or more secondary bypass ducts communicates with the respective one of the one or more outlet ducts connected to the respective one of the one or more brewing groups receiving the respective filter holder containing the respective coffee panel and an upstream water flow under pressure present in the hydraulic circuit upstream of the pump is delivered to the respective one of the one or more brewing groups, whereby pre-infusion of the coffee panel is made, wherein the memory of the control unit contains a further value for a further time interval during which the respective one of the one or more secondary feeding ducts communicates with the respective one of the one or more outlet ducts connected to the respective one of the one or more brewing groups receiving the respective filter holder containing the same respective coffee panel, and a downstream water flow under pressure present in the hydraulic circuit downstream of the pump is delivered to the respective one of the one or more brewing groups, whereby infusion of the coffee panel is made, wherein the coffee machine comprises two or more brewing groups, and wherein each secondary feeding duct with the corresponding secondary bypass duct and the corresponding valve assembly forms a pre-infusion sub-system for the respective brewing group, which pre-infusion sub-system is drivable and controllable separately from and independently of the pre-infusion sub-systems of the remaining brewing groups.

2. The coffee machine according to claim 1, wherein each valve assembly consists of a three-way valve.

3. The coffee machine according to claim 1, wherein the boiler is arranged in the hydraulic circuit downstream of the one or more valve assemblies.

4. The coffee machine according to claim 3, wherein the one or more outlet ducts pass through the boiler and are provided with respective heat exchangers at the boiler.

5. The coffee machine according to claim 1, wherein a brewing group valve is provided on each of the one or more outlet ducts, the brewing group valve selectively allowing or preventing the connection of the respective outlet duct to the respective brewing group.

6. The coffee machine according to claim 1, wherein a pressure reducer is arranged in the bypass duct.

7. The coffee machine according to claim 1, wherein a pressure reducer is arranged in the feeding duct.

8. The coffee machine according to claim 1, wherein the water source consists of a reservoir.

9. The coffee machine according to claim 1, wherein the coffee machine is an espresso coffee machine.

10. The coffee machine according to claim 1, wherein a pressure reducer is arranged in one or more of the one or more secondary bypass ducts.

11. The coffee machine according to claim 1, wherein a pressure reducer is arranged in one or more of the one or more secondary feeding ducts.

12. The coffee machine according to claim 1, wherein the water source consists of a connecting element for connection to a water main.

* * * * *